(12) United States Patent
Djugash et al.

(10) Patent No.: US 7,831,632 B2
(45) Date of Patent: Nov. 9, 2010

(54) METHOD AND SYSTEM FOR RECONSTRUCTION OF OBJECT MODEL DATA IN A RELATIONAL DATABASE

(75) Inventors: Judy I. Djugash, New Brighton, MN (US); Travis M. Drucker, Rochester, MN (US); Hoa T. Tran, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1564 days.

(21) Appl. No.: 10/901,591

(22) Filed: Jul. 29, 2004

(65) Prior Publication Data
US 2006/0026189 A1 Feb. 2, 2006

(51) Int. Cl.
*G06F 17/30* (2006.01)
(52) U.S. Cl. .................. 707/803; 707/955; 707/999.101
(58) Field of Classification Search .................. 707/1–4, 707/10, 100–102, 200, 736, 803, 953, 955, 707/999.001, 999.003, 999.006, 999.01, 707/999.1, 999.101, 999.102
See application file for complete search history.

(56) References Cited

U.S. PATENT DOCUMENTS

| | | | |
|---|---|---|---|
| 6,725,227 B1 | 4/2004 | Li | |
| 6,970,874 B2 * | 11/2005 | Egilsson et al. | 707/100 |
| 7,114,147 B2 * | 9/2006 | Ballantyne et al. | 717/107 |
| 7,149,730 B2 * | 12/2006 | Mullins et al. | 1/1 |
| 7,346,635 B2 * | 3/2008 | Whitten et al. | 1/1 |
| 2005/0228800 A1 * | 10/2005 | Dettinger et al. | 707/100 |

OTHER PUBLICATIONS

Dettinger et al., IBM U.S. Appl. No. 10/083,075, filed Feb. 26, 2002, "Application Portability and Extensibility Through Database Schema and Query Abstraction".

* cited by examiner

*Primary Examiner*—Marc R Filipczyk
(74) *Attorney, Agent, or Firm*—Patterson & Sheridan, LLP

(57) ABSTRACT

Methods, systems and articles of manufacture are provided for migrating entity relationship data residing in an object oriented program environment to a relational database schema. Further, functionality is provided to facilitate more efficient searching and reconstruction of the entity relationship data in the relational database.

30 Claims, 13 Drawing Sheets

FIG. 8

| ParentID String | ChildID String | TreeID |
|---|---|---|
| Experiment:Gene Logic U512-Table 1 | DB:MO | Experiment:Gene Logic U512-Table 1 |
| Experiment:Gene Logic U512-Table 1 | Person:Anderson, miko | Experiment:Gene Logic U512-Table 1 |
| Experiment:Gene Logic U512-Table 1 | Security: IRB_ONLY | Experiment:Gene Logic U512-Table 1 |
| Experiment:Gene Logic U512-Table 1 | Organization:MicroArray Core Facility | Experiment:Gene Logic U512-Table 1 |
| Organization:MicroArray Core Facility | Organization:Amya Foundation (Note: as Parent) | Experiment:Gene Logic U512-Table 1 |
| Person:Anderson, miko | Organization:Amya Foundation (Note: as Affiliation) | Experiment:Gene Logic U512-Table 1 |
| Security: IRB_ONLY | SecurityGroup:IRB- | Experiment:Gene Logic U512-Table 1 |
| Organization:Amya Foundation | Organization:NONE [Note: no parent] | Experiment:Gene Logic U512-Table 1 |
| Person:Syed, Jilani | Organization:Amya Foundation (Note: as Affiliation) | BioAssay:Amya MAF STD CDF |
| BioAssay:Amya MAF STD CDF | Person:Syed, Jilani | BioAssay:Amya MAF STD CDF |
| BioAssay:Amya MAF STD CEL PROTOCOL | Person:Anderson, miko | BioAssay:Amya MAF STD CEL PROTOCOL |
| BioAssay:Amya MAF STD CDF | Protocol Application:PA1 | BioAssay:Amya MAF STD CDF |
| BioAssay:Amya MAF STD CEL PROTOCOL | Protocol Application:PA101 | BioAssay:Amya MAF STD CEL PROTOCOL |
| BioAssay:Amya MAF STD CDF | Feature Extraction:FE1 | BioAssay:Amya MAF STD CDF |
| BioAssay:Amya MAF STD CEL PROTOCOL | Feature Extraction:FE9 | BioAssay:Amya MAF STD CEL PROTOCOL |
| Person:Anderson, miko | Organization:Amya Foundation (Note: as Affiliation) | BioAssay:Amya MAF STD CEL PROTOCOL |

METHOD AND SYSTEM FOR RECONSTRUCTION OF OBJECT MODEL DATA IN A RELATIONAL DATABASE

CROSS-RELATED APPLICATION

Field of the Invention

This application is related to the following commonly owned application: U.S. patent application Ser. No. 10/083,075, filed Feb. 26, 2002, entitled "Application Portability And Extensibility Through Database Schema And Query Abstraction", which is hereby incorporated herein in its entirety.

BACKGROUND OF THE INVENTION

1. Field of the Invention

The present invention generally relates to data processing and more particularly to migrating entity relationship data from an object oriented program environment to a relational database. The present invention further relates to providing functionality to efficiently search and reconstruct the entity relationship data in the relational database.

2. Description of the Related Art

Databases are computerized information storage and retrieval systems. The most prevalent type of database is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses.

A relational database management system (RDBMS) is a computer database management system that uses relational techniques and is capable of storing and retrieving large volumes of data. Further, large scale relational database management systems can be implemented to support thousands of users accessing databases via a wide assortment of applications. An RDBMS can be structured to support a variety of different types of operations for a requesting entity (e.g., an application, the operating system or an end user). Such operations can be configured to retrieve, add, modify and delete information being stored and managed by the RDBMS. Standard database access methods support these operations using high-level query languages, such as the Structured Query Language (SQL).

The functionality provided by relational databases is especially useful for MicroArray Analysis, one of the domains within Life Sciences. The MicroArray research community has architected a specification for MicroArray Gene Expression (MAGE) data which incorporates the different entities and relationships that are involved in MicroArray research. Large volumes of MAGE data are present in a variety of applications implemented in numerous object oriented programming environments. It is very important for researchers to be able to query and manipulate this data in order to appropriately analyze the data. However, due to issues such as large volumes of data (in the order of terabytes), it is technically cumbersome for researchers to work with data in an object oriented program environment. It would be advantageous to manage this data in a relational database environment.

However, there are numerous difficulties related to migrating MAGE data to a relational database implementation. One of the greatest difficulties is the reconstruction of all aspects of data entity relationships within the relational database. Object oriented program environments and relational database environments rely on considerably different conceptual bases. For this reason, those skilled in the art will appreciate that relationships between entities in an object oriented program environment and the corresponding relationships in a relational environment are represented in very different ways. For instance, in the case of MAGE implementations, large numbers of relational database objects are required to represent all the necessary MAGE entities and the relationships between the entities. The MAGE relational database footprint may span hundreds of tables (and other data structures), which makes the importing of data and reconstruction of entity relationships nontrivial.

Therefore, what is needed is an improved system and method for transferring entity relationship data from an object oriented program environment to a relational database. Once in the relational database, there is a further need to facilitate the searching and reconstruction of entity relationships.

SUMMARY OF THE INVENTION

The present invention is generally directed to a method, system and article of manufacture for migrating entity relationship data residing in an object oriented program environment to a relational database. The present invention further directed to facilitating improved searching of entity relationship data in the relational database.

One embodiment of the present invention provides a computer implemented method for creating a table populated with information derived from an object oriented program environment. The method generally includes providing data structures residing in a relational database managed by a relational database management system, the data structures containing data related to entities and entity relationships in the object oriented program environment, and populating a lookup table within the relational database with metadata of the entity relationships, wherein the metadata includes descriptions of the hierarchical relationships between entities in the entity relationships.

Another embodiment provides a computer implemented method for creating a table. The method generally includes providing entity relationships between entities in an object oriented program environment, wherein entities are instances of objects, creating a document in a text-based markup language format containing data related to the entities and entity relationships in the object oriented program environment. The method also includes extracting data related to the entities and the entity relationships from the document in the text-based markup language and loading the data into data structures residing in a relational database, and populating a lookup table in the relational database with metadata of the entity relationships, wherein the metadata includes description of hierarchical relationships between entities in the entity relationships.

Another embodiment provides a computer-readable medium containing a data structure for storing metadata corresponding to data related to entities and entity relationships comprising a lookup table containing an entry for each of a plurality of entity relationships, each entry containing a parent ID string, a child ID string, and a tree ID string.

Another embodiment provides a method in a computer system for displaying entity relationship data. The method generally includes displaying a first graphical object for selecting an entity type, displaying a second graphical object for selecting an entity, and in response to selection of an entity type via the first graphical object and selection of an entity via the second graphical object, querying entity relationship data in a relational database based on the selected entity type and entity.

Another embodiment provides a computer implemented method for creating a table populated with information derived from an object oriented program environment. The method generally includes providing data structures residing in a relational database, the data structures containing data related to entities and entity relationships in the object oriented program environment. The method also includes populating a lookup table within the relational database with metadata of the entity relationships, wherein the metadata includes descriptions of the hierarchical relationships between entities in the entity relationships, and querying entity relationship data in the relational database via a query building application that utilizes a data abstraction model for logically representing physical data structures in the relational database.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 8 illustrates a view of a relational database table which contains records describing relationships between entities;

DETAILED DESCRIPTION OF THE PREFERRED EMBODIMENTS

Figure 1:
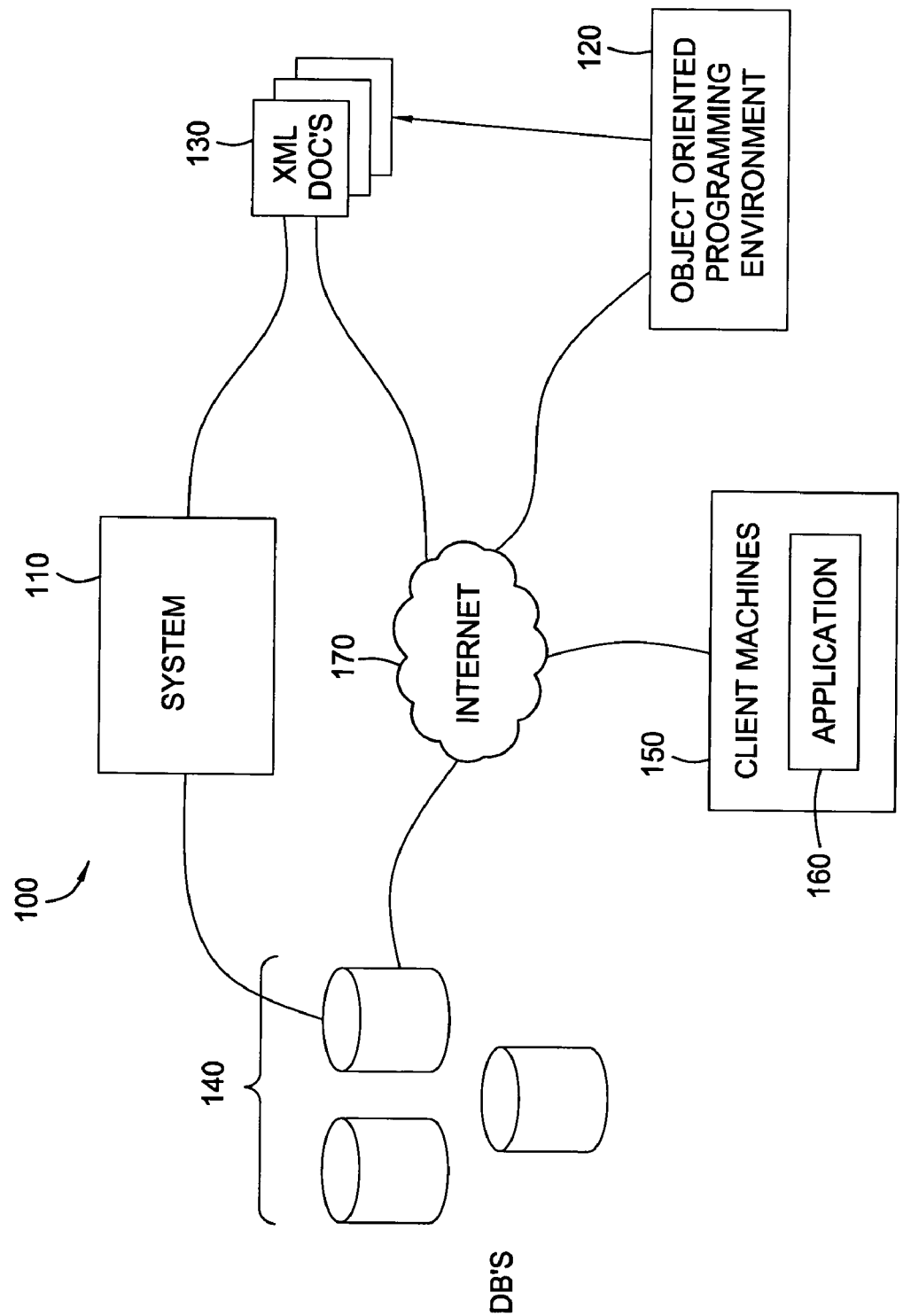
FIG. 1 is a computer system illustratively utilized in accordance with the invention.

The present invention is generally directed to methods, systems and articles of manufacture for migrating entity relationship data residing in an object oriented program environment to a relational database. Further, functionality is provided to facilitate more efficient searching and manipulation of the entity data in the relational database.

Further, in the following, reference is made to embodiments of the invention. The invention is not, however, limited to specific described embodiments. Instead, any combination of the following features and elements, whether related to different embodiments or not, is contemplated to implement and practice the invention. Furthermore, in various embodiments the invention provides numerous advantages over the prior art. Although embodiments of the invention may achieve advantages over other possible solutions or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in the claims. Similarly, reference to "the invention" shall not be construed as a generalization of any inventive subject matter disclosed herein and shall not be considered to be an element or limitation of the appended claims, except where explicitly recited in a specific claim.

As used herein, the term user may generally apply to any entity utilizing the data processing system described herein, such as a person (e.g., an individual) interacting with an application program or an application program itself, for example, performing automated tasks. While the following description may often refer to a graphical user interface (GUI) intended to present information to and receive information from a person, it should be understood that in many cases, the same functionality may be provided through a non-graphical user interface, such as a command line and, further, similar information may be exchanged with a non-person user via a programming interface.

As used herein, the term object model may generally apply to a collection of descriptions of classes or interfaces, together with their member data, member functions, and class-static operations. Further, the term object tree may generally apply to a hierarchical arrangement of objects in accordance with requirements for a specific implementation. Accordingly, the term object tree may also refer to herein as hierarchical structures. Also, the term entity relationship data may also be referred to herein as hierarchical data.

As used herein, the term relational database generally refer to a collection of data arranged for ease and speed of search and retrieval. Further, a relational database comprises logical and physical structures managed by a relational database management system (RDBMS).

Data Processing Environment

One embodiment of the invention is implemented as a program product for use with a computer system. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

Embodiments of the invention can be implemented in a hardware/software configuration including at least one networked client computer and at least one server computer. Furthermore, embodiments of the present invention can apply to any comparable hardware configuration, regardless of whether the computer systems are complicated, multi-user computing apparatus, single-user workstations, or network appliances that do not have non-volatile storage of their own. Further, it is understood that while reference may be made to particular query languages, including SQL, the invention is not limited to a particular language, standard or version. Accordingly, persons skilled in the art will recognize that the invention is adaptable to other query languages and that the invention is also adaptable to future changes in a particular query language as well as to other query languages presently unknown.

PREFERRED EMBODIMENTS

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and, unless explicitly present, are not considered elements or limitations of the appended claims.

Referring now to FIG. 1, a relational view of components in an embodiment of a processing environment 100 is illustrated. Generally, the components shown in FIG. 1 may be implemented in any combination of software and/or hardware. In a particular embodiment, the components shown are implemented as software and reside on a computer system. One embodiment of the processing environment 100 includes a hardware server 110, object oriented program environment 120, XML documents 130, a relational database management system (RDBMS) managing relational databases 141 and one or more client machines 150 (only one shown). All the aforementioned components of the processing environment 100 are linked via a network 170, which may be the Internet 170.

According to one embodiment of the current invention, data residing in the relational database 141 may be accessed via applications 160 residing on one or more client machines 150. As will be described later, the applications 160 utilized to access the entity relationship data could include query building applications that interface directly with the RDBMS 140 or via other data abstraction based applications.

Figure 2:
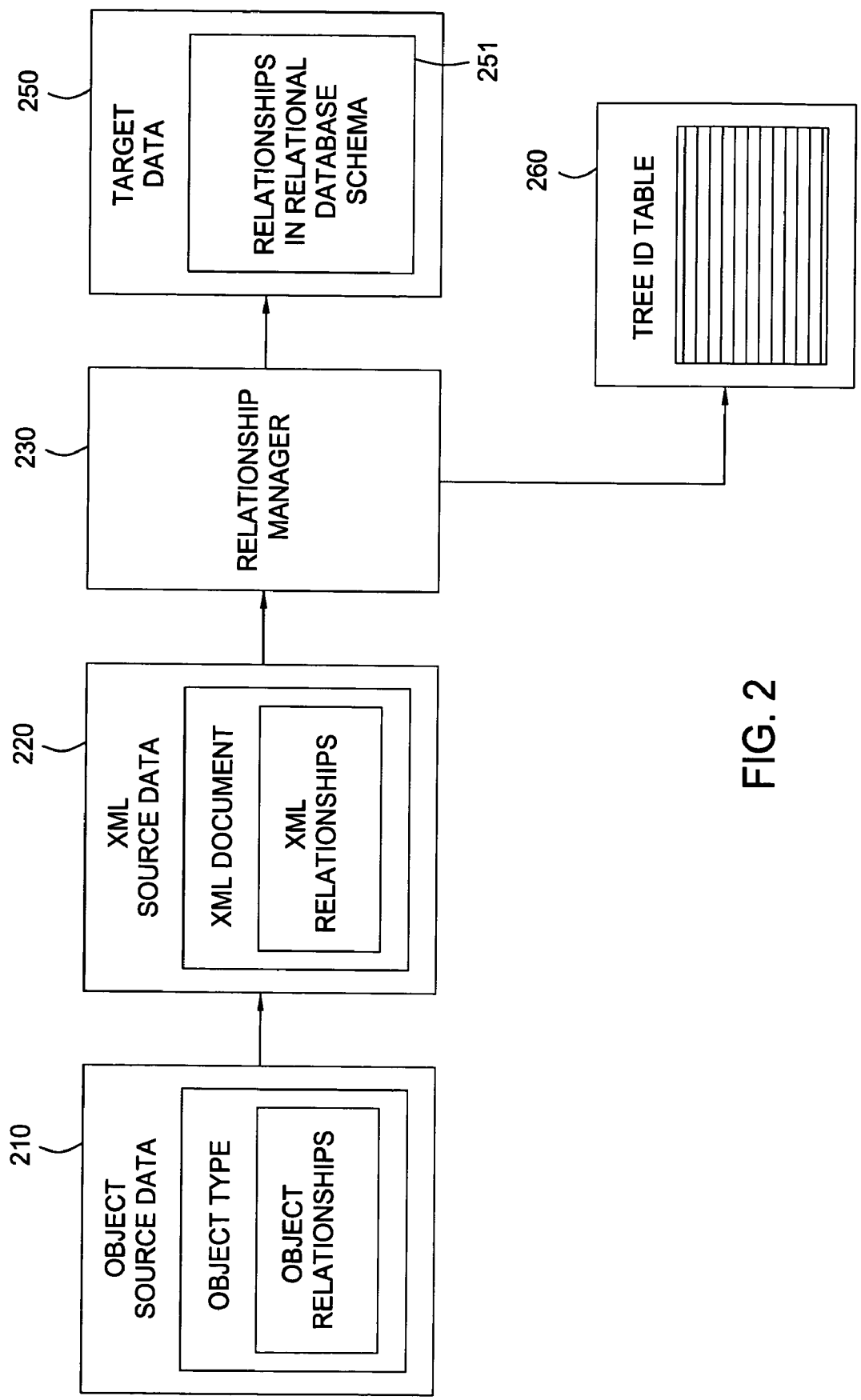
FIG. 2 is a relational view of software components according to one embodiment of the invention.

As stated above, it may not be technically suitable for users to work with entity relationship data in an object oriented program environment 120. However, it is advantageous to utilize relational databases to facilitate robust querying ability of such entity relationship data. Robust querying ability can constitute accommodating large numbers of users querying the database concurrently. Further, the database may comprise voluminous data residing in a network of data structures. As such, it is desirable to migrate entity relationship data arranged in hierarchical structures (also referred to herein as object trees) in an object oriented program environment to a relational database. FIG. 2, a relational view of software components according to one embodiment of the present invention, illustrates the flow of data from the object oriented program environment 120 (source data) to the relational database 141 (target data).

In an object oriented program environment 120, available entities, or instances of objects, and the relationship between the entities are often presented with the use of an object model 210. The object model 210 can include a large number of entities. Further, the object model 210 shows that there are numerous relationships between the entities. The numerous relationships between the different entities can be thought of as a network of relationships; often the network can become complex. Object models will be described in more detail with reference to FIGS. 3 and 4.

As stated earlier, it is not convenient to store or query data in the object environment. Accordingly, data associated with entities is extracted and placed into XML documents. XML is able to represent the object model in a format that is similar to the relationship of objects in the object oriented program environment. The entity relationships extracted from the object oriented program environment are left intact. One reason for this is that XML documents are not restricted to data integrity constraints associated with relational databases. XML documents are simply text files that are designed to store various types of data including hierarchical data. In addition, XML formatted documents make it is easier to load data into relational databases.

Unfortunately, while XML documents can accurately represent the object model, it is not very convenient to query data in the XML format. As mentioned above, for querying purposes, it is advantageous to have the entities represented in a relational database 250, and more specifically, in a relational database schema 251. Database schemas are generally defined as collections of logical structures and physical structures of data, or schema objects. It is well known by those skilled in the art that relational databases provide exceptional functionality and performance for querying purposes. However, because of the inherent differences in the manner in which entity relationships are maintained in the object oriented/XML and relational database environments, a certain amount of data transformation is needed to populate entity relationship data into a corresponding relational database schema.

A relationship manager 230 is utilized to facilitate data transformation and loading of entity relationship data into a relational database schema 251. The relationship manager 230 references mappings to load entity relationship data from XML into the appropriate tables (or other data structures) in the relational database 141. Further, the relationship manager 230 analyzes the entity relationships and populates a TreeID lookup table 260 with metadata describing the entity relationships loaded into the relational database 141. Metadata is commonly defined as "data about the data". For instance, in the context of entity relationship data, metadata would comprise hierarchical information about a particular entity and its relationships with other entities within the hierarchy. Examples of entity relationship based metadata will be described with reference to FIGS. 4 and 8.

While the intermediate operations of extracting data to XML documents and then migrating the data from XML to the relational database 140 is described, it should be understood that any suitable markup language which facilitates the storing of hierarchical data may be used rather than XML. Further, it should also be understood, that embodiments of the current invention may accommodate direct transfer of data from an object oriented program environment to a relational database. In other words, there may not be a need for the intermediate step of extracting from the object environment with the use of a markup language.

Figure 4:
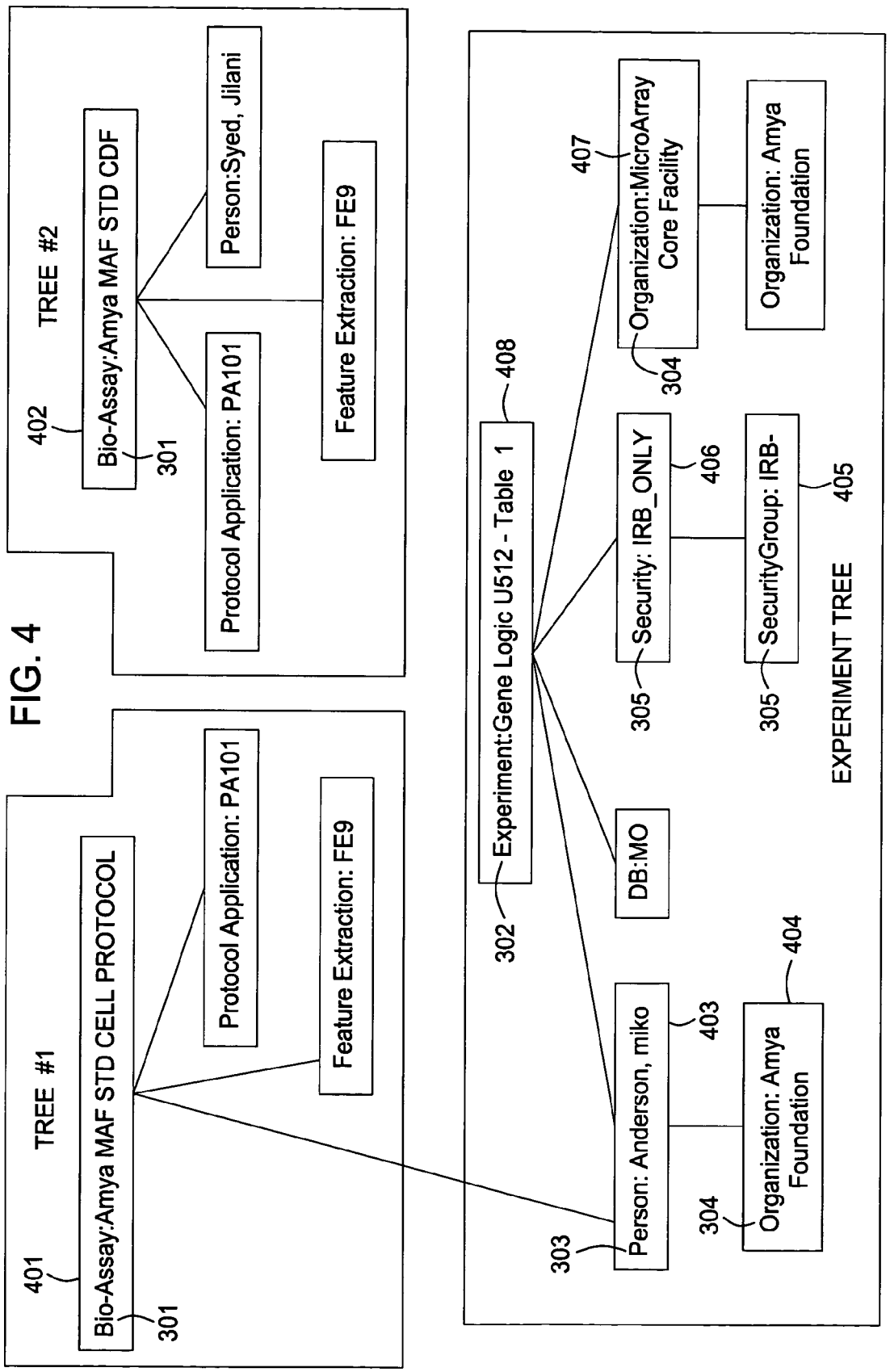
FIG. 4 illustrates object trees that relate to the object model illustrated in FIG. 3.
Figure 5:
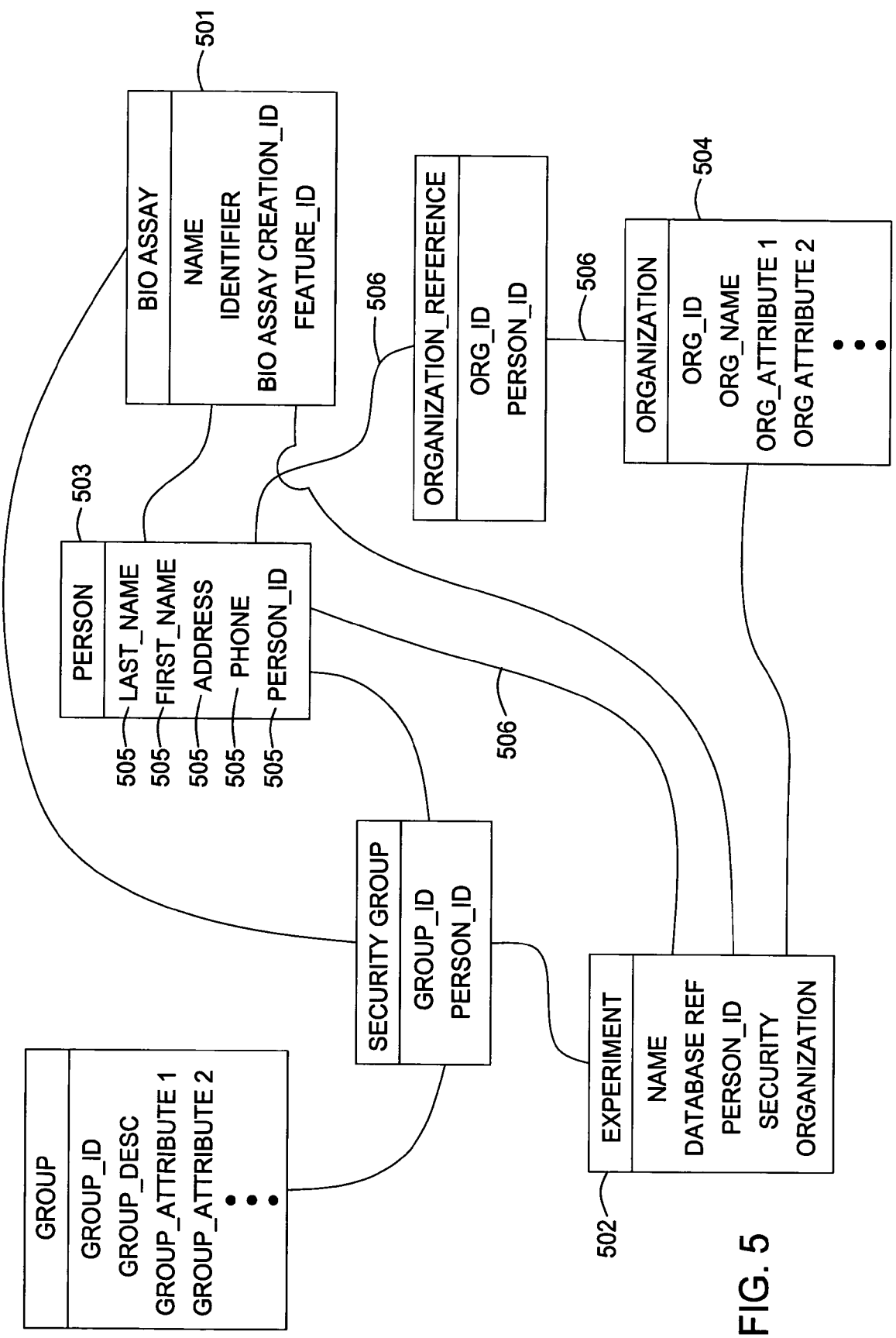
FIG. 5 is an entity relationship diagram illustrating a portion of a relational database schema.

To further clarify the process described with reference to FIG. 2, sample data related to experiments and bioassays in the context of MAGE is utilized. The MAGE data is shown in various representations, including the object oriented program environment 120 (FIGS. 3 and 4), XML documents 130 (Tables I and II), and a relational database (FIG. 5). Detailed discussion of each representation of the entity relationship data follows.

Figure 3:
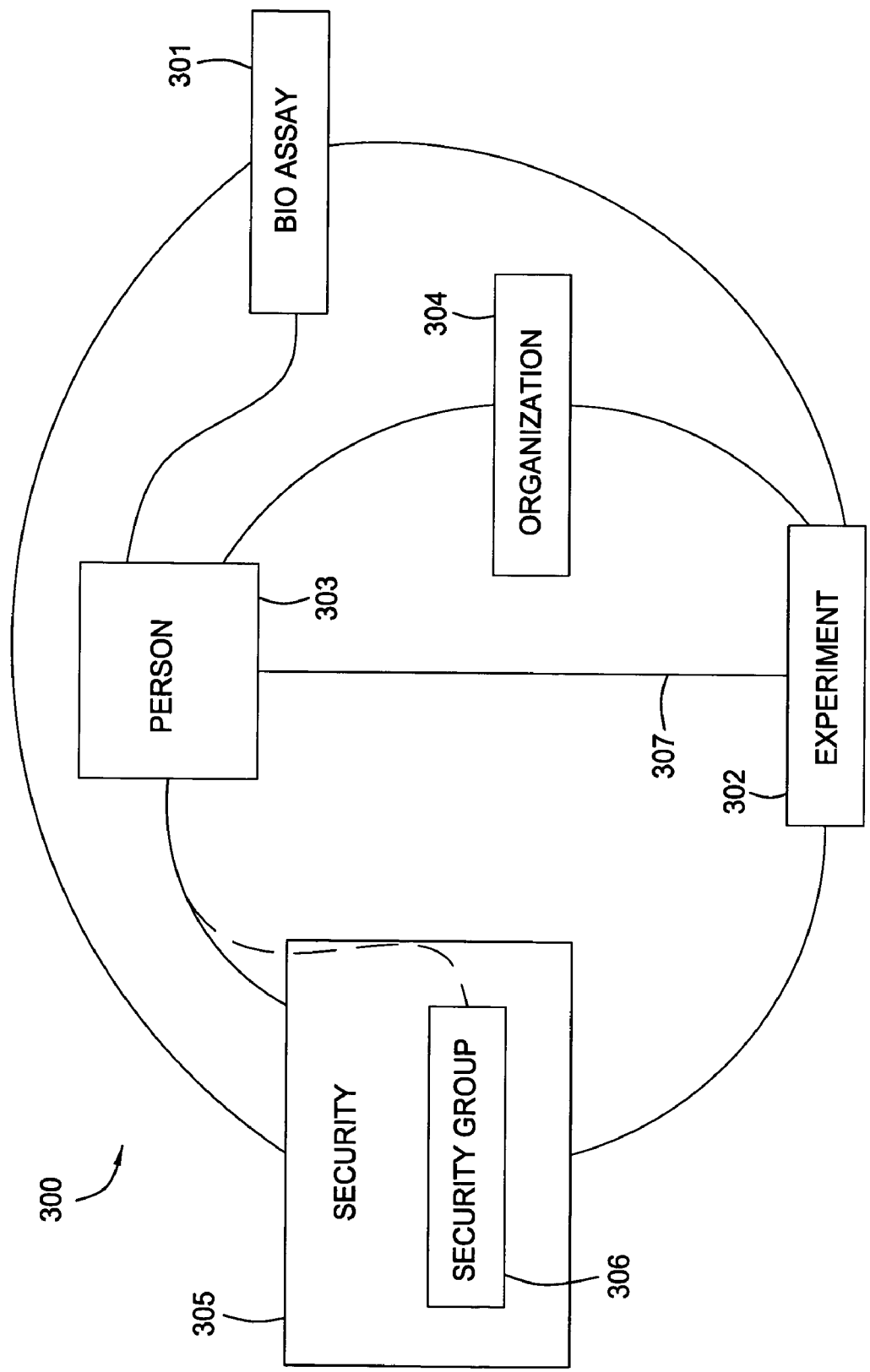
FIG. 3 is a high level object model illustrating conceptual relationships between various objects.

FIG. 3 is a high level object model illustrating conceptual relationships between various objects in an object oriented program environment 120. The object oriented program environment 300 includes several entities, or instances of objects, that are typical for a scientific testing environment, including: bioassay 301, experiment 302, person 303, organization 304 and security 305. It should be understood that while only one sample of each object is presented, there can be multiple instances of the listed objects. For example, while only one person object 303 is shown, multiple people (represented by respective entities) can exist in such an object environment 120. Further, each of these objects can contain sub-groups of objects—such as security group 306 residing within the security object 305.

FIG. 3 further illustrates lines 307 connecting the different objects. These lines 307 denote relationships between the objects. It can be seen that the network of relationships do not form a hierarchical structure. Also it should be understood that because FIG. 3 is meant to present a high level view of the object environment, it does not present specific attributes of each of the objects. These objects are available for building applications or program modules to provide specific functionality. These are well known aspects of an object oriented program environment that are understood by those skilled in the art.

During the application building process, objects are utilized in a hierarchical manner. For instance certain calling objects (or referencing objects) will reference other objects (also referred to as referenced objects). In turn, the called objects may themselves reference other objects, and so on. This hierarchy of called objects may be referred to as an object tree 450. In other words, an object tree represents an implementation of a group of objects; the objects are implemented in a specified hierarchical order to provide the desired functionality. FIG. 4 illustrates three object trees 450 based on the object oriented program environment 120 described with reference to FIG. 3.

The nodes of the trees are labeled in the form of "entity type: entity name". For example, one of the trees includes an object (reference number 403) labeled in the following manner: "Person:Anderson, miko". In this case, the entity type is "Person" and the entity name is "Anderson, miko". Each of the tree structures 450 has a specific root node, also referred to herein as a TreeID. The three different TreeID values shown are: "BioAssay: Amya MAF STD CEL PROTOCOL" 401, "BioAssay: Amya MAF STD CDF" 402 and "Experiment: Gene Logic U512—Table 1"408. It should be noted that entities related to both experiments and bioassays are included. Further, FIG. 4 illustrates that both trees can utilize the same entities.

For simplicity of notation, some entity relationships are described as parent/child relationships. However, it should be understood that these are not meant to convey a parent/child relationship as understood with reference to relational databases. For a particular relationship, the "parent" node may be an instance of the referencing object and the "child" node may be an instance of the referenced object. For instance, "BioAssay: Amya MAF STD CEL PROTOCAL" 401 serves as a parent node to "Person: Anderson, Miko" 403. Further, "Person: Anderson, Miko" 403 serves as the parent node for "Organization: Amya Foundation" 404. Again, the use of the parent and child is used to convey the location of an entity within a tree hierarchy and its relationship with other entities.

Extraction to XML

For some embodiments, an intermediate step that is taken during the migration of data from an object environment 120 to a relational database 141 is extracting the object data into XML documents 130. Table I below includes a sample extract of the object oriented program environment 120 described with reference to FIGS. 3 and 4.

TABLE I

SAMPLE EXTRACT

| | |
|---|---|
| 001 | <Organization identifier="MCLSS:Microarray:Organization:MicroArray Core Facility" |
| 002 | name="Amya MicroArray Core Facility"> |
| 003 | <Parent_assnref> |
| 004 | <Organization_ref identifier="Organization:Amya Foundation"/> |
| 005 | </Parent_assnref> |
| 006 | </Organization> |
| 007 | <Security_assnlist> |
| 008 | <Security identifier="MCLSS:Microarray:Security:IRB_Only"> |
| 009 | <Owner_assnreflist> |
| 010 | <Organization_ref |
| 011 | identifier="MCLSS:Microarray:Organization:IRB"/> |
| 012 | </Owner_assnreflist> |
| 013 | <SecurityGroups_assnreflist> |

TABLE I-continued

SAMPLE EXTRACT

```
014                         <SecurityGroup_ref
015                         identifier="MCLSS:Microarray:SecurityGroup:IRB- ">
016                 </SecurityGroups_assnreflist>
017         </Security>
018   </Security_assnlist>
019   <Person identifier="MCLSS:Microarray:Person:Anderson, miko"
020   "email=Anderson.Miko@Amya.edu lastName="Anderson" firstName="miko" midInitials="">
021         <Roles_assnlist>
022                 <OntologyEntry category="Role" value="Primary Investigator"
023                 description="Primary Investigator">
024                 </OntologyEntry>
025         </Roles_assnlist>
026         <Affiliation_assnref>
027                 <Organization_ref identifier="Organization:Amya Foundation"/>
028         </Affiliation_assnref>
029   </Person>
030   <Organization identifier="Organization:Amya Foundation" name="Amya Foundation"
031   URI="http://www.Amya.edu/"address="1 First Street NW, Rochester, MN 55901">
032   </Organization>
033   <SecurityGroup_assnlist>
034         <SecurityGroup identifier="MCLSS: Microarray:SecurityGroup:IRB-" name    "IRB-">
035                 <Members_assnreflist>
036                         <Person_ref identifier="MCLSS:Microarray:Person:Anderson, miko">
037                         <Organization_ref identifier=
038   "MCLSS:Microarray:Organization:MicroArray Core Facility"/>
039                 </Members_assnreflist>
040         </SecurityGroup>
041   </SecurityGroup_assnlist>
042   <Experiment identifier="MCLSS:Microarray:Experiment:Gene Logic U512 spikein study,
043   Table 1" name="Gene Logic U512 spikein study, Table 1">
044   <.............../.>
045   </Experiment>
```

Table I above includes a sample extract of the object oriented program environment 120 described thus far. Portions of Table 1 correspond directly to several of the objects and entities described with reference to FIGS. 3 and 4. For instance, the XML code in Table I includes references to experiment 302 (lines 042-045), person 303 (lines 019-020), organization 304 (lines 030-032) and security 305 (lines 007-018). Further, relationships between entities are clearly defined. For example, the relationship between entities "Person: Anderson, Miko" and "Organization: Amya Foundation" is defined on lines 019 through 029.

Table II below shows additional XML code that corresponds to the BioAssay related trees illustrated in FIG. 4. For instance, lines 001-027 demonstrate the parent and child relationship of "BioAssay: Amya MAF STD CEL PROTOCOL" 401 and "Person: Anderson, Miko" 403.

TABLE II

SAMPLE BIOASSAY XML EXTRACT

```
001   <BioAssay_package>
002     <BioAssay_assnlist>
003       <PhysicalBioAssay
004   identifier="MCLSS:Microarray:PhysicalBioAssay:Gene_Logic_U512_spikein_study_Table_1_
005   1" name="Gene_Logic_U512_spikein_study_Table_1_1">
006       </PhysicalBioAssay>
007       <MeasuredBioAssay
008   Identifier="MCLSS:Microarray:MeasuredBioAssay:Gene_Logic_U512_spikein_study_Ta
009   ble_1_1" name="AMYA_MAF_STD_CEL_Protocol_v1">
010         <FeatureExtraction_assn>
011           <FeatureExtraction
012   Identifier="MCLSS:Microarray:FeatureExtraction:Gene_Logic_U512_spikein_study_Table_1_
013   1" name="Gene_Logic_U512_spikein_study_Table_1_1">
014             <ProtocolApplications_assnlist>
015               <ProtocolApplication activityDate="">
                    <.............../>
016               <Performers_assnreflist>
017                 <Person_ref identifier="MCLSS Microarray:Person:Anderson,
018                     miko:/>
018               </Performers_assnreflist>
019               <Protocol_assnref>
020                 <Protocol_ref identifier="MCLSS:Microarray:Protocol:Feature
021                     extraction"/>
022               </Protocol_assnref>
023             </ProtocolApplication>
```

TABLE II-continued

SAMPLE BIOASSAY XML EXTRACT

```
024        </ProtocolApplications_assnlist>
           <............../>
025        </MeasuredBioAssay>
026     </BioAssay_assnlist>
027   </BioAssay_package>
```

Once the entity relationship data is extracted and placed into XML documents, the relationship manager 230 inserts the contents of the XML documents into a corresponding relational database schema 251. FIG. 5 is an entity relationship diagram illustrating a portion of a relational database schema 251. In the context of relational databases, entity relationship diagrams (ERD's) illustrate RDBMS managed relationships between data structures, such as tables. ERD's are a useful medium to achieve a common understanding of data among users and application developers.

The particular ERD illustrated in FIG. 5 corresponds to the object oriented program environment 120 illustrated in FIG. 3. For instance, Bioassay 301, experiment 302, person 303 and organization 304 are all represented—each is an individual table 501, 502, 503 and 504, respectively. It should be noted that all the boxes shown represent tables in the relational database schema 251. Each table comprises several columns which may correspond to attributes or fields of the objects from object oriented program environment 120. For example, the Person table 503 contains a variety of columns 505 including "LAST_NAME", "FIRST_NAME" and "ADDRESS".

FIG. 5 also illustrates numerous lines connecting the different tables. These lines represent data integrity constraints. Data integrity constraints include primary keys, foreign keys and other referential integrity based constraints. Specifically, the lines 506 shown on FIG. 5 are based on referential integrity constraints. Referential integrity preserves the defined relationships between tables when records are entered or deleted. Usually, referential integrity is based on relationships between foreign keys and primary keys or between foreign keys and unique keys. Referential integrity ensures that key values are consistent across tables. Such consistency requires that there be no references to nonexistent values and that if a key value changes, all references to it change consistently throughout the database.

FIG. 5 shows that entity relationship data is being splintered across many tables. This is often the result of data normalization. Data normalization allows for the reduction in data redundancies and more efficient use of storage. Further, normalization simplifies enforcement of referential integrity constraints. For example, notice that both Bioassay table 501 and Experiment table 502 table have relationships with many of the same tables, including the Person table 503. Normalization of this type allows for all information on researchers that are related to both Experiments and Bioassays to be stored in one table.

Figure 6:
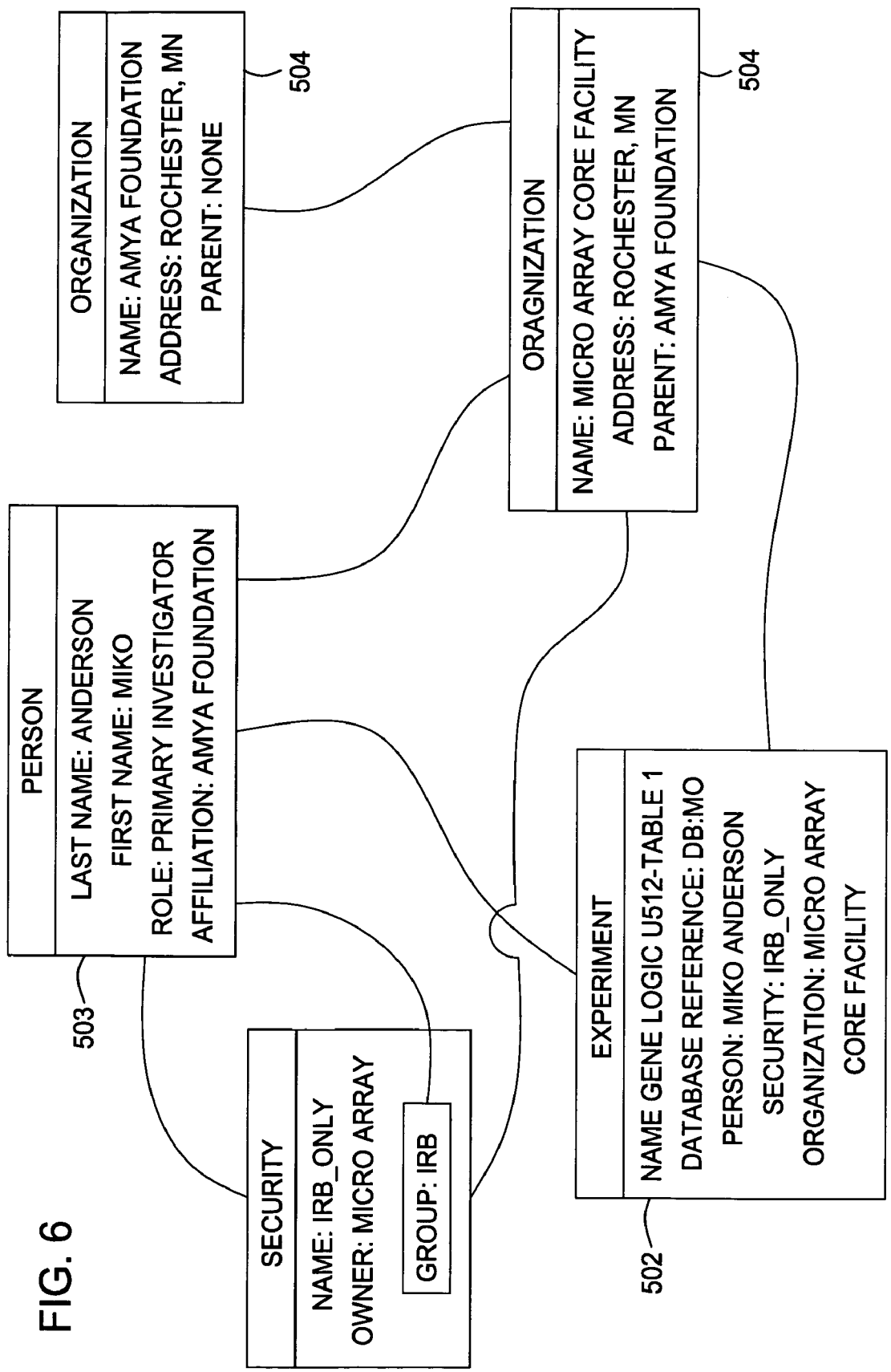
FIGS. 6 and 7 illustrate conceptual views of relationships between entities in a relational database.
Figure 7:
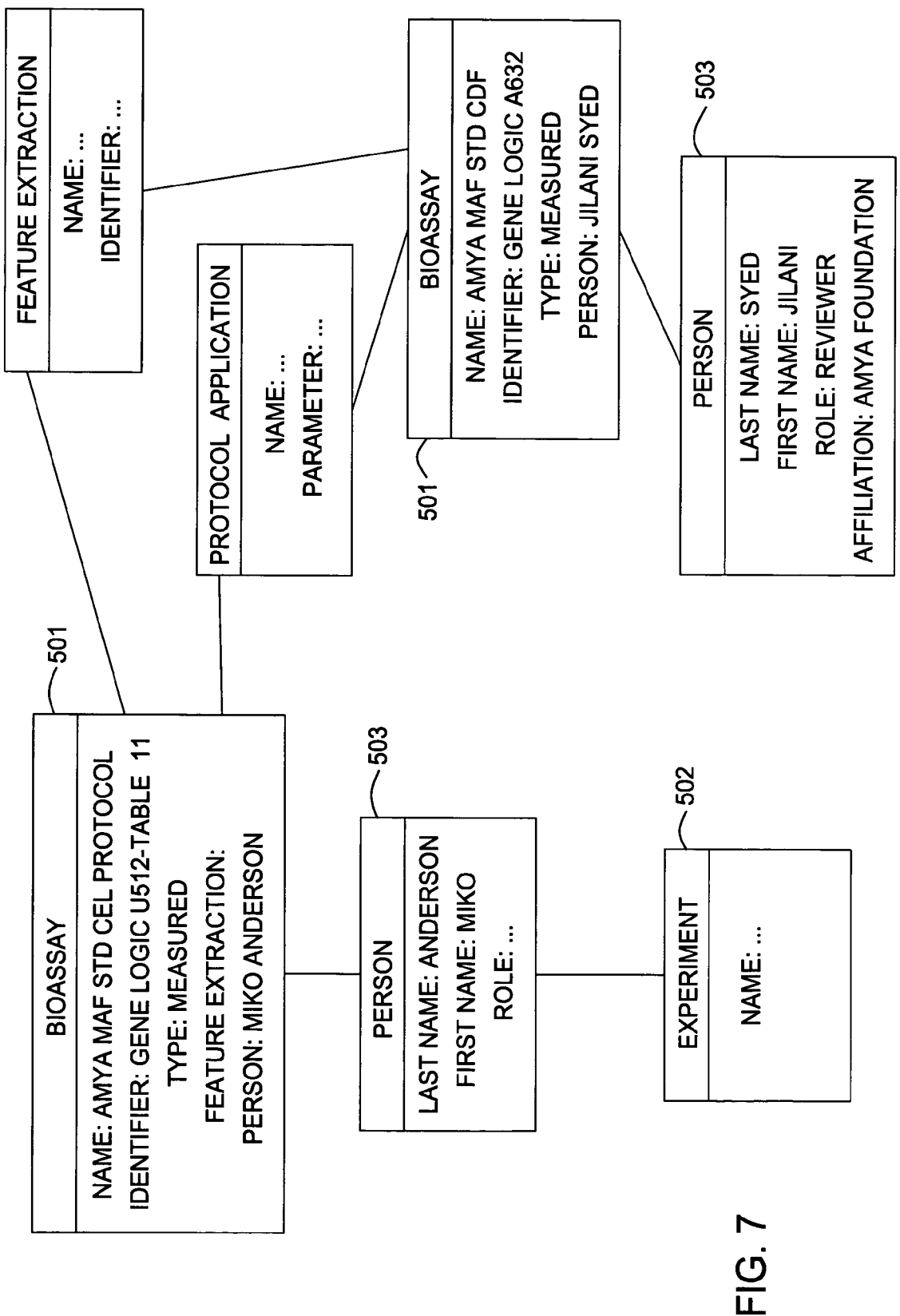

FIGS. 6 and 7 are conceptual diagrams showing entity relationships defined within tables included in the ERD described with reference to FIG. 5. FIG. 6 focuses on Experiment data, while FIG. 7 is focused on Bioassay data. Each of the boxes shown in these figures contain data that represent one row of a particular table. For instance, the Person table 503 in FIG. 6 lists information related to data values associated with all the columns of the Person table 503 record based on "Miko Anderson".

FIGS. 6 and 7 also provide a conceptual view of the relationship between specific rows of different tables. These relationships correspond to the entity relationships described with reference to FIGS. 3 and 4. For example, it can be seen that a relationship exists between the "Miko Anderson" record of the Person table 503 and the "Amya Foundation" record of the Organization table 504. It should be understood that while this figure is explicitly illustrating relationships between particular rows of various tables, these figures are also showing relationships between specific entities (e.g., "Miko Anderson"-"Amya Foundation").

The splintering of data as it is loaded into a relational database makes it difficult for users to work with the data. One of the problems faced by users is that they are unaware of all the different tables that contain records that define relationships between specific entities. For example, if a user was trying to determine all the relationships the entity "Miko Anderson" is a part of, the user may not know which tables to check for such information. Accordingly, embodiments of the invention provide the TreeID lookup table 260, which is a standard relational table that contains information on the entity relationship data loaded into the relational database schema 251. Persons skilled in the art will understand that the use of a single lookup table, such as the TreeID lookup table 260, allows for improved speed and efficiency in the context of building and analyzing relationships. For instance, with this approach, users would only need to interrogate one table with one simple query to determine a series of relationships rather than having to interrogate numerous tables many times to determine the same relationships. Further, a simple query against the TreeID lookup table 260 for a specific entity can provide a complete view of all relationships the entity is a part of, and can describe the hierarchies within which that relationship is defined.

As the relationship manager 230 processes each new entity relationship extracted from the object oriented program environment 120, a corresponding record (or entry) is added to the TreeID lookup table 260. For some embodiments, as entity relationship data is extracted from the object oriented program environment 120 and loaded into the relational database schema 251, metadata (including hierarchical data) representing each entity relationship is populated into the TreeID lookup table 260. Each record may contain a parent ID string representing a parent node of an entity relationship, a child ID string representing a child node of an entity relationship, and a tree ID string representing a root node of an hierarchy that contains the entity relationship.

FIG. 8 illustrates an exemplary TreeID lookup table 260 according to one embodiment of the current invention. The TreeID lookup table 260 of FIG. 8 comprises three columns ParentIDString 801, ChildIDString 802 and TreeID 803 which contain data values that represent a parent node, child node and root node, respectively, of an entity relationship. The data values in each of the columns may be listed in the same format that nodes on the tree diagrams (described with reference to FIG. 4) are labeled: "entity type: entity name".

It should be noted that while the TreeID lookup table 260 is shown with only three columns, in other embodiments this table may include several other columns for storing additional attributes of the entity relationships. Further, additional columns may also facilitate improved querying ability against the TreeID lookup table 260.

As stated earlier, the TreeID lookup table 260 is managed by the relationship manager 230. The interaction of the relationship manager 230 and the TreeID lookup table 260 is described in more detail with reference to FIG. 9. An example demonstrating a manner in which the TreeID lookup table 260 may be used to facilitate improved entity relationship querying capability is described with reference to FIG. 10.

Figure 9:
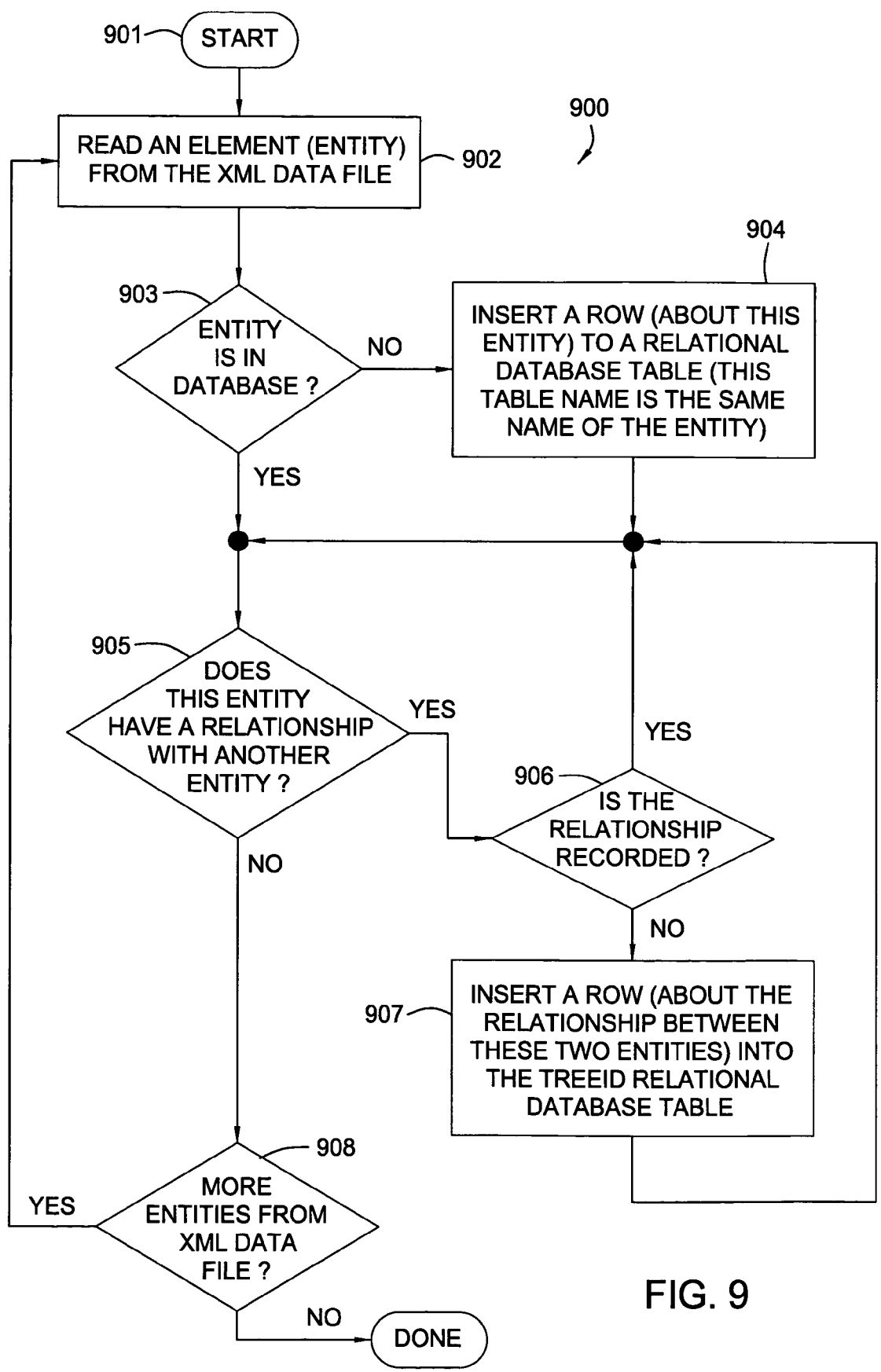
FIG. 9 illustrates a flow chart illustrating exemplary operations for inserting relationship data in a relational database schema according to aspects of one embodiment of the present invention.

FIG. 9 illustrates a flow chart comprising exemplary operations for inserting relationship data in a relational database schema 251 according to one embodiment of the present invention. These operations are performed by the relationship manager 230. At step 901, the operations 900 begin processing an XML file containing source data (similar to that of Table I and Table II). At step 902, an entity is identified and extracted from the XML data file. Via a query against the TreeID Lookup Table 260, a determination is made if the present entity is already in the relational database schema 251 at step 903. If the entity does not already exist in the relational database schema 251, at step 904 a new record is inserted in the appropriate table(s). For example, suppose that the present entity is of entity type Person, at this step, if it is determined that the person does not have a record in the Person table, a new record is inserted accordingly. Further, if the entity type does not exist, a new table altogether may be created to accommodate the new entity type.

At step 905, the XML is analyzed to determine if the present entity has any relationships with other entities. If it is determined that one or more relationships exist between the present entity and other entities, then processing proceeds to step 906 where the TreeID lookup table 260 is queried to determine if these particular relationships are recorded. If it is found that the present relationship is recorded, processing returns to step 905 to handle any other relationships. If the answer to the question of step 906 is "No", the attributes of the present relationship are recorded in the TreeID lookup table 260 during step 907. Next, processing returns to step 905 where the next relationship for the present entity is processed.

However, if no more relationships are included in the XML for the current entity, processing proceeds to step 908. At step 908, it is determined if the XML contains any other entities that need to be imported into the relational database schema. If the answer to the question of step 908 is "Yes", processing returns to step 902. Once all the entities in the XML file are analyzed, the processing is complete.

Figure 10:
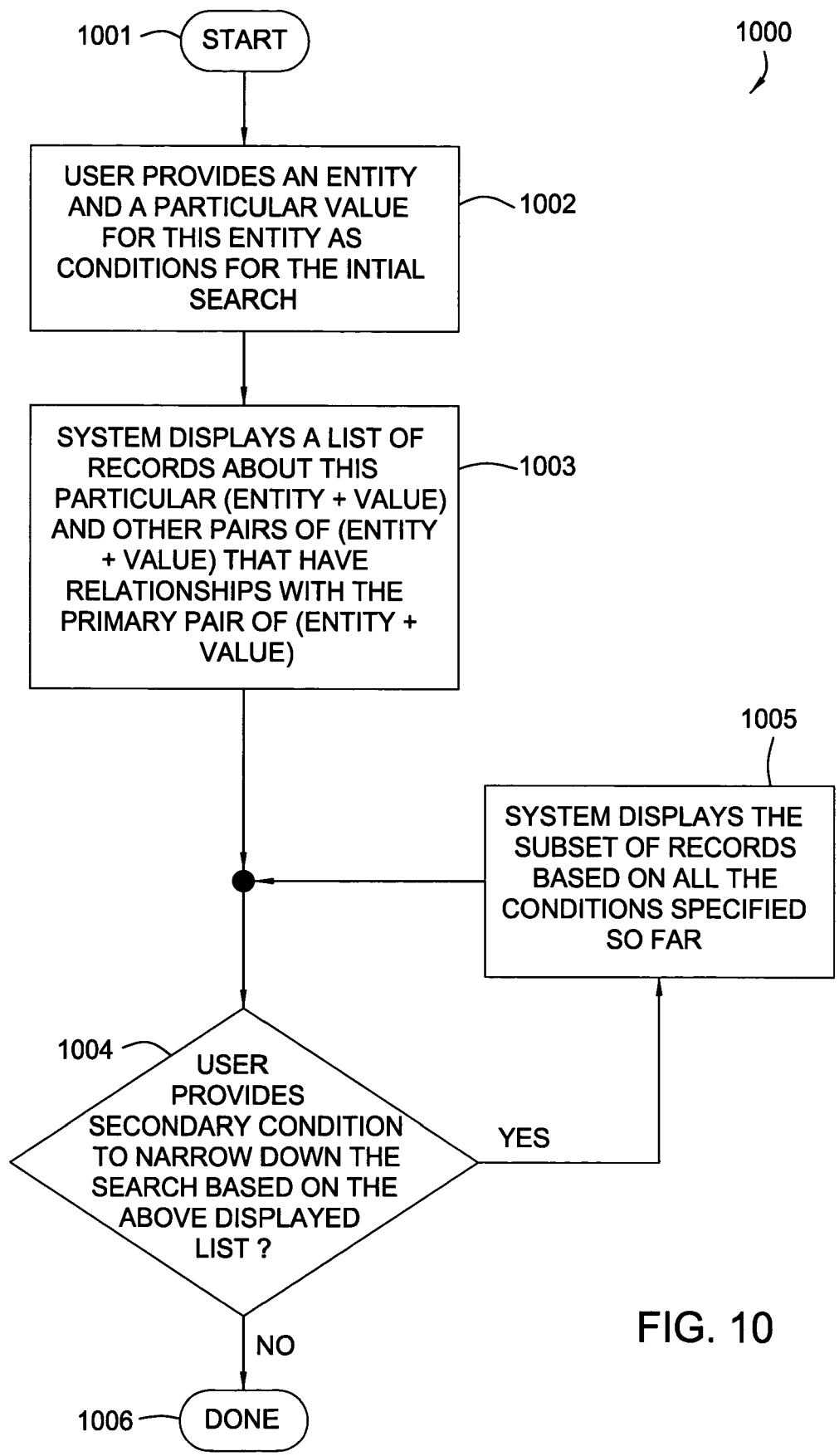
FIG. 10 illustrates a flow chart illustrating exemplary operations for performing queries, according to aspects of one embodiment of the present invention.

FIG. 10 illustrates a flow chart showing exemplary operations 1000 for performing queries against the relational database schema 251 according to one embodiment of the present invention. At step 1001 operations 1000 begin. At step 1002, the user provides an entity that will serve as the basis of the query. Optionally, the user may provide an entity type. At step 1003, the system provides a list of records relating to the particular entity input by the user. The system also includes those records pertaining to entities that have relationships with the entity supplied by the user—these relationship based records are identified via the TreeID lookup table 260. At step 1004, the user is provided an opportunity to supply any additional conditions to further filter out the search results. The additional conditions may include specifying a second entity, for example. At step 1005, the system provides an updated result set per the additional conditions supplied by the user. If the user desires, processing can be returned to step 1004 and additional conditions can be included.

It should be understood that the steps described above with reference to operations 1000 are an exemplary set of operations according to one embodiment of the present invention. A variety of intermediate steps can be added to this process according to requirements of a particular application.

Following is an example query performed according to operations 1000. Suppose a user wants to perform a search on the entity "Miko Anderson", to determine what relationships this entity has with other entities, and also to determine which tables from the relational database schema 251 would need to be queried. Operations 1000 are performed with the user supplied entity of "Miko Anderson". Suppose that the TreeID table described with reference to FIG. 8 is queried. All the rows where the value "Miko Anderson" appears as the ParentIDString 801, ChildIDString 802 or TreeID 803 will be returned to the user. The user can then scan the result set returned by the system and specify some more filter conditions. For instance, the user may want to see only records where "Miko Anderson" and "Amya Foundation" appear—in other words, the user is interested in retrieving TreeID's of all records that designate a relationship between Miko Anderson and Amya Foundation.

Figure 11:
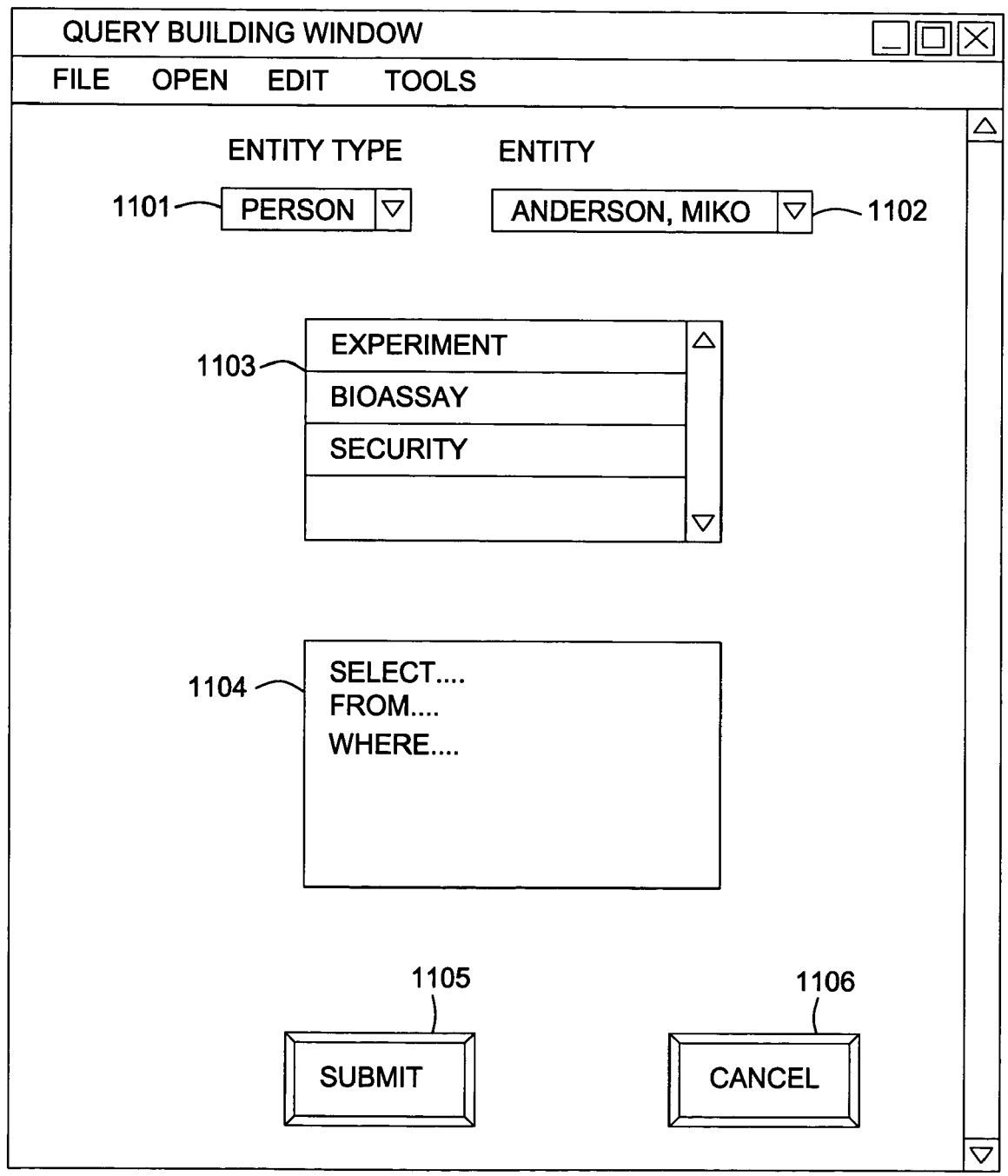
FIG. 11 illustrates an exemplary graphical user interface (GUI) screen in accordance with one embodiment of the present invention.

FIG. 11 illustrates an exemplary graphical user interface (GUI) screen for performing queries in accordance with one embodiment of the present invention. This form may be part of a query building application available for users to query the relational database schema 251 directly.

A drop down box 1101 is provided and shows a list of all available entity types in the database. It should be noted that features of this form including the drop down box 1101 and text box 1102 are based upon running queries against the TreeID lookup table 260. For example, the entity type values shown via the dropdown box 1101 may be based upon the result set received from running a query for a list of unique entity types present in the TreeID lookup table 260.

A text box 1102 that accepts the user's input for an entity, such as "Miko Anderson", is provided. Based on the selected entity type and entity value that was input, a list of appropriate tables 1103 where relationships exist between the user specified entity and other entities is presented. This allows the user to quickly determine that records pertaining to relationships between the input entity ("Miko Anderson") and other entities exist in the presented tables (e.g., Experiment, Bioassay and Security).

Once the user has gathered the appropriate information, such as a list of appropriate tables to query, a freeform text box 1104 is provided for the user to enter a SQL query. Once the user is satisfied with the query entered in the freeform text box 1104, the user can select a submit button 1105 to run the entered query. If the user wishes to exit the form without performing any action, the cancel button 1106 can be selected.

Abstract Queries

In one embodiment, the base queries are composed and issued as abstract, or logical, queries. An abstract query is composed using logical fields defined by a data abstraction model. Each logical field is mapped to one or more physical entities of data of an underlying data representation (e.g., XML, SQL, or other type representation) being used in the database being queried. Furthermore, in the data abstraction model the logical fields are defined independently from the underlying data representation, thereby allowing queries to be formed that are loosely coupled to the underlying data representation, The abstract query can be configured to access the data and return query results, or to modify (i.e., insert, delete or update) the data. For execution against the database, the abstract query is transformed into a form (referred to herein as a concrete query) consistent with the underlying data representation of the data 162. Abstract queries and transformation of abstract queries into concrete queries is described in detail in the commonly owned, co-pending U.S. patent application Ser. No. 10/083,075, entitled "APPLICATION PORTABILITY AND EXTENSIBILITY THROUGH DATABASE SCHEMA AND QUERY ABSTRACTION," filed Feb. 26, 2002, which is incorporated by reference in its entirety.

Figure 12:
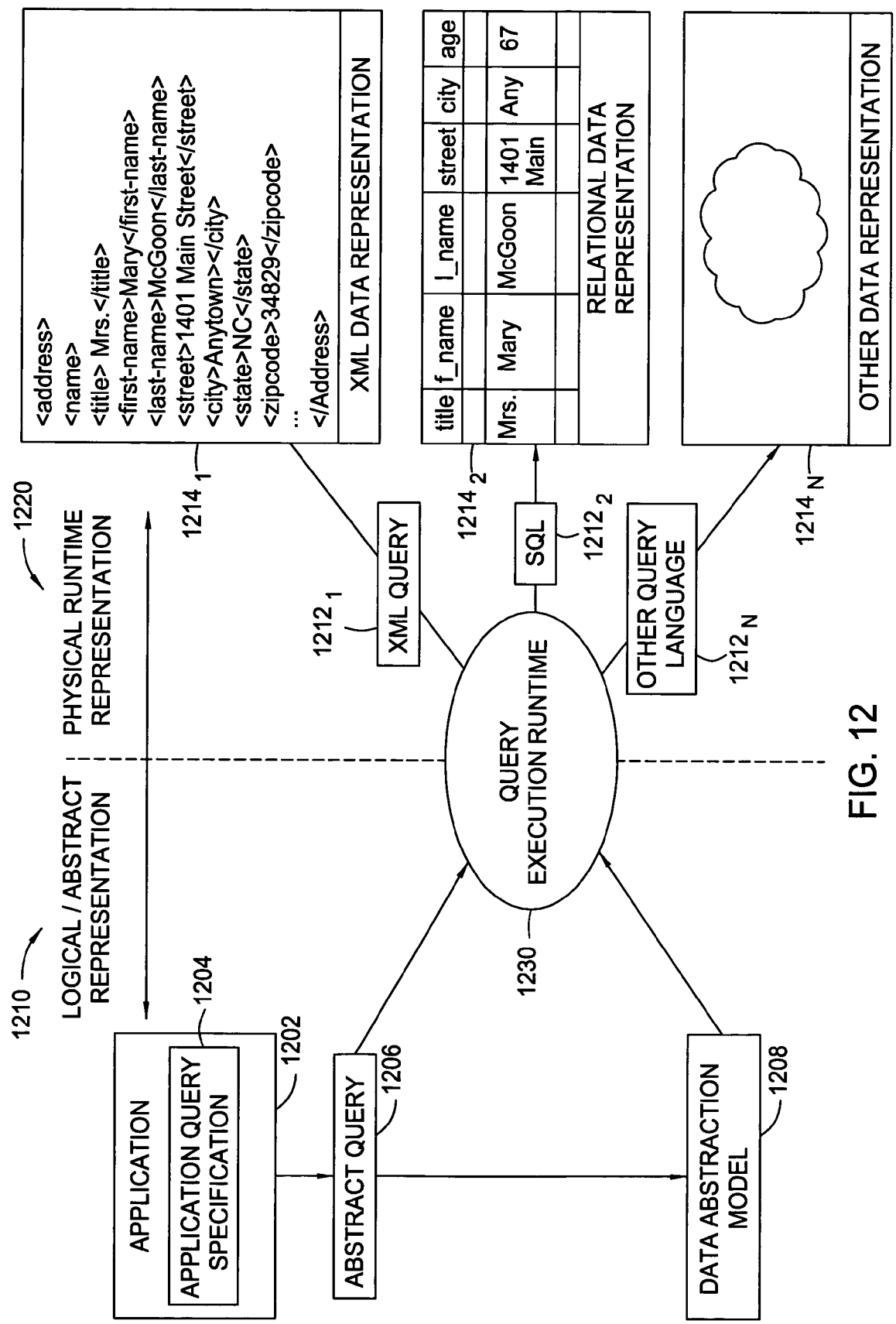
FIG. 12 is a relational view of software components for abstract query management.

FIG. 12 shows a block diagram of an exemplary model for processing abstract queries received from a requesting entity. The requesting entity (e.g., an application 1202) issues a query 1206 as defined by the respective application query specification 1204 of the requesting entity. In one embodiment, the application query specification 1204 may include both criteria used for data selection (selection criteria) and an explicit specification of the fields to be returned (return data specification) based on the selection criteria. The logical fields specified by the application query specification 1204 and used to compose the abstract query 1206 are defined by the data abstraction model (DAM) 1208.

In general, the data abstraction model 1208 exposes information as a set of logical fields that may be used within a query (e.g., the abstract query 1206) issued by the application 1202 to specify criteria for data selection and specify the form of result data returned from a query operation. The logical fields are defined independently of the underlying data representation 1220 being used in the databases, thereby allowing queries to be formed that are loosely coupled to the underlying data representation 1220. The data to which logical fields of the DAM 1208 are mapped may be located in a single repository (i.e., source) of data or a plurality of different data repositories. Thus, the DAM 1208 may provide a logical view of one or more underlying data repositories. By using an abstract representation 1210 of a data repository, the underlying physical representation 1220 can be more easily changed or replaced without affecting the application 1202 making the changes. Instead, the abstract representation 1210 is changed with no changes required by the application 1202. In addition, multiple abstract data representations can be defined to support different applications against the same underlying database schema that may have different default values or required fields.

In general, the data abstraction model 1208 comprises a plurality of field specifications. Specifically, a field specification is provided for each logical field available for composition of an abstract query 1206. Each field specification comprises a logical field name and an associated access method. The access methods associate (i.e., map) the logical field names to a particular physical data representation $1214_1$, $1214_2$ ... $1214_N$ in a database according to parameters referred to herein as physical location parameters. By way of illustration, two data representations are shown, an XML data representation $1214_1$ and a relational data representation $1214_2$. However, the physical data representation $1214_N$ indicates that any other data representations, known or unknown, are contemplated.

The logical fields and access methods in each abstract query 1206 are processed by a runtime component 1230 which transforms the abstract queries into a form (referred to as a concrete query) consistent with the physical representation 1220 of the data contained in one or more of the databases. A concrete query is a query represented in languages like SQL $1212_2$, XML Query $1212_1$, and other query languages $1212_N$ and is consistent with the data of a given data representation 1220 (e.g., a relational data representation $1214_2$, XML data representation, $1214_1$, or other data representation $1214_N$). Accordingly, the concrete query is used to locate and retrieve data from a given data representation 1220.

Figure 13:
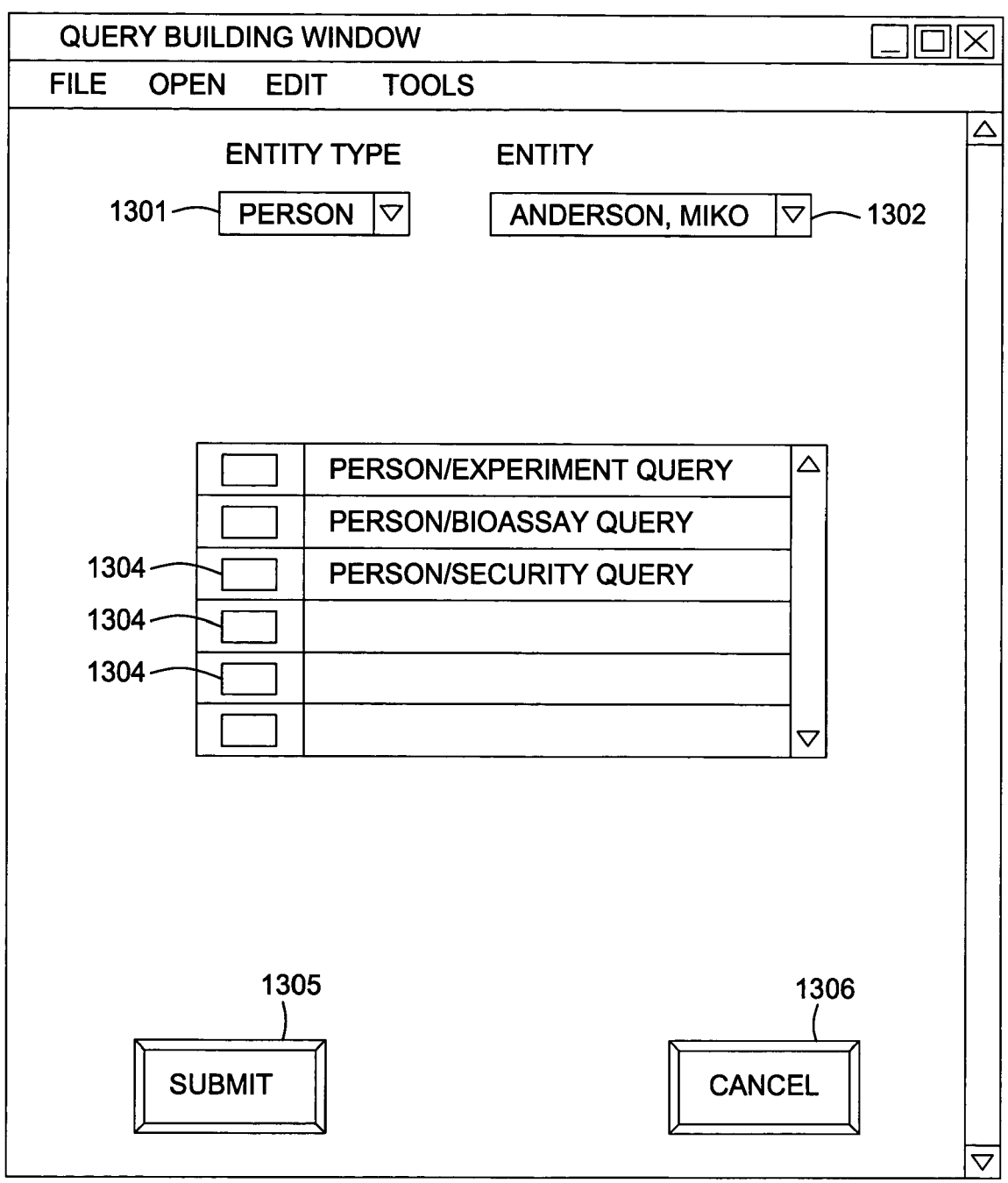
FIG. 13 illustrates an exemplary graphical user interface (GUI) screen related to building and submitting abstract queries in accordance with one embodiment of the present invention.

FIG. 13 illustrates an exemplary graphical user interface (GUI) screen related to building and submitting abstract queries in accordance with one embodiment of the present invention. Specifically, FIG. 13 illustrates an exemplary form belonging to a particular application which allows for the running of previously defined abstract queries. One embodiment of the form may allow for a set of saved abstract queries to be presented based on the entity type and entity value selected by the user.

A drop down box 1301 is provided to allow the user to select an entity type. Another drop down box 1302 is provided to allow the user to select a particular entity that is of the element type selected via dropdown box 1301. Based on the entity type and entity value selected, a list of contextually appropriate saved abstract queries 1303 are presented to the user. The user can select the desired saved abstract query by selecting the check box adjacent to the particular saved abstract query. Once a saved abstract query 1303 is selected, it can be submitted to the database for execution by selecting the Submit button 1305. The user can exit the form by selecting Cancel 1306.

The examples described above are presented in the context of micro array gene expression (MAGE) data. However, those skilled in the art will recognize the methods described herein may be utilized for entity relationship data residing in any object oriented programming environment.

While the examples described herein have referred to relationships from only one schema, those skilled in the art will appreciate that embodiments of the present invention can support multiple schemas. In fact, implementing the methods described herein is even more advantageous in an environment comprising numerous schemas, with each schema containing a large number of entity relationships (i.e., an environment with disparate and voluminous data). In such an environment, embodiments of the present invention can be configured to facilitate datamining efforts, which may include the collection of statistics and performing trend analysis related to entity relationships.

It should be noted that any reference herein to particular values, definitions, programming languages and examples is merely for purposes of illustration. Accordingly, the invention is not limited by any particular illustrations and examples. Furthermore, while the foregoing is directed to embodiments of the present invention, other and further embodiments of the invention may be devised without departing from the basic scope thereof, and the scope thereof is determined by the claims that follow.

What is claimed is:

1. A computer implemented method for creating a table populated with information derived from an object oriented program environment, comprising:

storing data structures in a relational database managed by a relational database management system, the data structures containing data related to entities and entity relationships in the object oriented program environment;

storing a lookup table within the relational database; and
populating the lookup table within the relational database with metadata of the entity relationships, wherein the metadata includes descriptions of hierarchical relationships between the entities in the entity relationships.

2. The computer implemented method of claim 1, further comprising providing an interface to submit queries to the relational database management system, wherein the queries pertain to the entities and entity relationships.

3. The computer implemented method of claim 1, further comprising:
querying the lookup table based on a first set of user provided selections of at least one entity type and entity value; and
providing a first set of query results based on the first set of user selections.

4. The computer implemented method of claim 3, further comprising:
querying the entity relationship data based on a second set of user provided selections, wherein the selections are chosen from the first set of query results; and
providing a second set of query results based on the second set of user selections.

5. The computer implemented method of claim 1, wherein the data structures residing in the relational database are organized in database schemas and are selected from one of: tables, indexes and views.

6. The computer implemented method of claim 5, wherein the data related to entities and entity relationships reside in two or more database schemas.

7. The computer implemented method of claim 1, wherein populating the lookup table comprises including an entry for each of the plurality of entity relationships, each entry containing a parent ID string representing a parent node of an entity relationship, a child ID string representing a child node of an entity relationship, and a tree ID string representing a root node of an hierarchy that contains the entity relationship.

8. The computer implemented method of claim 1, wherein populating the lookup table comprises creating records corresponding to all relationships a particular entity is a part of.

9. The computer implemented method of claim 1, wherein the lookup table comprises columns which contain data values that represent a parent node, child node and root node, respectively.

10. The computer-implemented method of claim 1, further comprising:
querying the lookup table and the data structures via a query building application that logically represents physical data structures in the relational database according to a data abstraction model.

11. A computer readable storage medium containing a program which, when executed, performs an operation for creating a table populated with information derived from an object oriented program environment, the operation comprising:
storing data structures in a relational database managed by a relational database management system, the data structures containing data related to entities and entity relationships in the object oriented program environment;
storing a lookup table within the relational database; and
populating the lookup table within the relational database with metadata of the entity relationships, wherein the metadata includes descriptions of hierarchical relationships between the entities in the entity relationships.

12. The computer readable storage medium of claim 11, wherein when executed further provides an interface to submit queries to the relational database management system, wherein the queries pertain to the entities and entity relationships.

13. The computer readable storage medium of claim 11, wherein the executable code of the database management system includes a query engine which, when executed by the processor, is configured to:
query the lookup table based on a first set of user provided selections of at least one entity type and entity value; and
provide a first set of query results based on the first set of user selections.

14. The computer readable storage medium of claim 13, wherein the query engine which, when executed by the processor, is further configured to:
query the entity relationship data based on a second set of user provided selections, wherein the selections are chosen from the first set of query results; and
provide a second set of query results based on the second set of user selections.

15. The computer readable storage medium of claim 11, wherein the data structures residing in the relational database are organized in database schemas and are selected from one of: tables, indexes and views.

16. The computer readable storage medium of claim 15, wherein the data related to entities and entity relationships reside in two or more database schemas.

17. The computer readable storage medium of claim 11, wherein populating the lookup table comprises including an entry for each of the plurality of entity relationships, each entry containing a parent ID string representing a parent node of an entity relationship, a child ID string representing a child node of an entity relationship, and a tree ID string representing a root node of an hierarchy that contains the entity relationship.

18. The computer readable storage medium of claim 11, wherein populating the lookup table comprises creating records corresponding to all relationships a particular entity is a part of.

19. The computer readable storage medium of claim 11, wherein the lookup table comprises columns which contain data values that represent a parent node, child node and root node, respectively.

20. The computer readable storage medium of claim 11, wherein when executed, further queries the lookup table and the data structures via a query building application that utilizes a data abstraction model for logically representing physical data structures in the relational database.

21. An apparatus, comprising:
a processor;
a relational database managed by a relational database management system, the relational database storing:
data structures containing data related to entities and entity relationships in the object oriented program environment; and
a lookup table; and
the database management system having executable code which, when executed by the processor, performs an operation comprising:
populating the lookup table within the relational database with metadata of the entity relationships, wherein the metadata includes descriptions of hierarchical relationships between the entities in the entity relationships.

22. The apparatus of claim 21, further comprising an interface to submit queries to the relational database management system, wherein the queries pertain to the entities and entity relationships.

23. The apparatus of claim 21, wherein the executable code of the database management system includes a query engine which, when executed by the processor, is configured to:
  query the lookup table based on a first set of user provided selections of at least one entity type and entity value; and
  provide a first set of query results based on the first set of user selections.

24. The apparatus of claim 23, wherein the query engine which, when executed by the processor, is further configured to:
  query the entity relationship data based on a second set of user provided selections, wherein the selections are chosen from the first set of query results; and
  provide a second set of query results based on the second set of user selections.

25. The apparatus of claim 21, wherein the data structures residing in the relational database are organized in database schemas and are selected from one of: tables, indexes and views.

26. The apparatus of claim 25, wherein the data related to entities and entity relationships reside in two or more database schemas.

27. The apparatus of claim 21, wherein populating the lookup table comprises including an entry for each of the plurality of entity relationships, each entry containing a parent ID string representing a parent node of an entity relationship, a child ID string representing a child node of an entity relationship, and a tree ID string representing a root node of an hierarchy that contains the entity relationship.

28. The apparatus of claim 21, wherein populating the lookup table comprises creating records corresponding to all relationships a particular entity is a part of.

29. The apparatus of claim 21, wherein the lookup table comprises columns which contain data values that represent a parent node, child node and root node, respectively.

30. The apparatus of claim 21, wherein the query engine which, when executed by the processor, is further configured to query the lookup table and the data structures via a query building application that utilizes a data abstraction model for logically representing physical data structures in the relational database.

* * * * *